(12) United States Patent
Suzuki et al.

(10) Patent No.: US 7,866,859 B2
(45) Date of Patent: Jan. 11, 2011

(54) ILLUMINATED DISPLAY DEVICE FOR VEHICLE

(75) Inventors: Ryo Suzuki, Kariya (JP); Yoshinori Araki, Kariya (JP); Satoru Tamura, Anjo (JP)

(73) Assignee: Denso Corporation, Kariya (JP)

( * ) Notice: Subject to any disclaimer, the term of this patent is extended or adjusted under 35 U.S.C. 154(b) by 1163 days.

(21) Appl. No.: 11/515,027

(22) Filed: Sep. 5, 2006

(65) Prior Publication Data

US 2007/0052875 A1 Mar. 8, 2007

(30) Foreign Application Priority Data

Sep. 2, 2005 (JP) .............................. 2005-255381

(51) Int. Cl.
*B60Q 3/04* (2006.01)
(52) U.S. Cl. .............. 362/489; 362/311.13; 362/311.14; 362/97.2; 362/29; 340/441; 340/461; 40/451; 40/452; 116/62.4
(58) Field of Classification Search ................. 362/489, 362/545, 544, 249.02, 293, 29, 97.2, 311.13, 362/311.14; 340/441, 461; 40/444, 448, 40/451, 452; 116/62.4
See application file for complete search history.

(56) References Cited

U.S. PATENT DOCUMENTS

| | | | | |
|---|---|---|---|---|
| 2,053,826 A | * | 9/1936 | Hallerberg | .................. 340/521 |
| 2,238,071 A | * | 4/1941 | Nazar, Nicholas | .......... 374/143 |
| 5,578,985 A | * | 11/1996 | Cremers et al. | ............. 340/461 |
| 6,333,697 B1 | * | 12/2001 | Kumazawa et al. | ...... 340/815.4 |
| 6,409,355 B1 | * | 6/2002 | Simon et al. | ................... 362/23 |
| 6,461,006 B1 | * | 10/2002 | Matumoto | .................... 362/27 |
| 6,847,870 B2 | * | 1/2005 | Amagasa | ..................... 701/31 |
| 2002/0140552 A1 | * | 10/2002 | Wada | .......................... 340/438 |
| 2005/0012607 A1 | * | 1/2005 | Sumiya et al. | ............... 340/461 |
| 2005/0168330 A1 | * | 8/2005 | Ono et al. | .................... 340/461 |
| 2006/0181399 A1 | * | 8/2006 | Sumiya | ....................... 340/461 |

FOREIGN PATENT DOCUMENTS

JP        60-193497        12/1985

\* cited by examiner

*Primary Examiner*—Ismael Negron
(74) *Attorney, Agent, or Firm*—Nixon & Vanderhye PC (57) ABSTRACT

A display device for a vehicle has a first display unit constructed of a liquid crystal display for displaying first information and a second display unit including a display portion for displaying second information. The second information is illuminated by receiving light emitted from a light source and displayed at an intensity higher than an intensity of a background area that is illuminated by receiving light emitted from another light source. An optical coloring member is disposed such that an illuminating color and a brightness of the background area of the second display unit are substantially equal to those of a background area of the first information of the liquid crystal display.

7 Claims, 5 Drawing Sheets

ILLUMINATED DISPLAY DEVICE FOR VEHICLE

CROSS REFERENCE TO RELATED APPLICATION

This application is based on Japanese Patent Application No. 2005-255381 filed on Sep. 2, 2005, the disclosure of which is incorporated herein by reference.

FIELD OF THE INVENTION

The present invention relates to a display device for example used for a vehicle.

BACKGROUND OF THE INVENTION

A display device for a vehicle for example has an indication instrument for indicating various physical values relating to the vehicle, an indicator section for indicating operation conditions of the vehicle, a warning section for warning some abnormal conditions of the vehicle, and the like. In such a display device, it is known to use a liquid crystal display for displaying one of or some of the above display items, so as to improve an appearance and visibility.

For example, it is known to display an odometer that shows a cumulative traveling distance of the vehicle and a trip meter that shows a sectional traveling distance of the vehicle by using the liquid crystal display. The cumulative traveling distance and the sectional traveling distance are displayed in numbers on the liquid crystal display.

In the above display device, the display section constructed of the liquid crystal display coexists with general display sections that are not constructed of the liquid crystal display. The general display section is for example constructed of a dial board and a light source located behind the dial plate, for example. On the dial board, letters and characters for indicating information are formed as display designs. The display designs are luminously displayed on the dial board by being lit up with the light source.

The liquid crystal display is generally lit up by a back light provided on a back side. Display designs are luminously displayed in a dark light-shielded background. Namely, the display designs are visible in the dark background. In this case, the light from the back light is emitted over the liquid crystal display. Therefore, the light slightly passes through the background area. As such, the background area is visible not in a perfect black, but in indigo or dark gray.

On the other hand, the dial plate of the general display section is matte-finished. The display designs are formed on such a matte finished black surface by a transparent color processing. Therefore, a background area of the general display sections is visible in perfect black. As such, the background area of the liquid crystal display and the background area of the general display section have different color phase and brightness. Accordingly, the display device is likely to deteriorate a uniformed appearance.

SUMMARY OF THE INVENTION

The present invention is made in view of the foregoing matter, and it is an object of the present invention to provide a display device in which a display section, which is not constructed of a liquid crystal display, has an appearance similar to an appearance of the liquid crystal display.

According to an aspect of the present invention, a display device has a first display unit, a second display unit, and an optical coloring member. The first display unit has a first light source and a liquid crystal display for displaying first information. The liquid crystal display is illuminated by the light emitted from the first light source so that the first information is displayed at an intensity higher than that of a first background area that is on a periphery of the first information. The second display unit has a display portion for displaying second information, a second light source and a third light source. In the display portion, the second information is displayed by receiving the light emitted from the third light source at an intensity higher than an intensity of a background area of the second information, the background area being illuminated by receiving the light emitted from the second light source. The optical coloring member adjusts an illuminating color and a brightness of the second background area when the second light source is lighting up. The optical coloring member is provided such that the second background area has the illuminating color and the brightness substantially equal to those of the first background area of the first display unit when the first light source and the second light source are lighting up.

According to the above structure, the second background area is illuminated by the second light source. Further, the second background area is visible in the illuminating color and brightness substantially equal to those of the first background area. Therefore, the display portion has an appearance substantially similar to an appearance of the liquid crystal display. Accordingly, the display device has a uniformed and enhanced appearance. The display device is for example used for a vehicle.

According to a second aspect of the present invention, a display device has a light source unit for emitting light, a first display unit, a second display unit, and an optical coloring member. The first display unit has a liquid crystal display for displaying first information. The liquid crystal display is illuminated by the light emitted from the light source unit such that the first information is displayed at an intensity higher than an intensity of a first background area that is on a periphery of the first information in the liquid crystal display. The second display unit has a design plate on which a second information is formed. The second information is illuminated by receiving the light emitted from the light source unit at an intensity higher than an intensity of a second background area that is on a periphery of the second information. The optical coloring member is disposed in front of the design plate. The optical coloring member has a predetermined color phase and predetermined brightness such that the second background area has an illuminating color and brightness substantially equal to those of the first background area when the first background area and the second background are illuminated.

Accordingly, the second background area has an appearance similar to that of the first background area.

According to a third aspect of the present invention, a display device has a design plate, a light conductive member, a first light source, a second light source, and an optical coloring member. Display design to be informed is formed on the design plate. The light conductive member is disposed along a first surface of the design plate. The first light source is disposed adjacent to the light conductive member such that light emitted from the first light source is introduced in the light conductive member. The second light source disposed to oppose a second surface of the design plate for emitting light to the design plate. The second surface is opposite to the first surface. The optical coloring member is disposed on the light conductive member on a side opposite to the design plate. Further, the optical coloring member has a predetermined color phase and predetermined brightness.

For example, the predetermined color phase and predetermined brightness are determined such that the display device has an appearance similar to that of a surface of a liquid crystal display when the first light source and the second light source are lighting up.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EXAMPLE EMBODIMENT

First Example Embodiment

Figure 1:
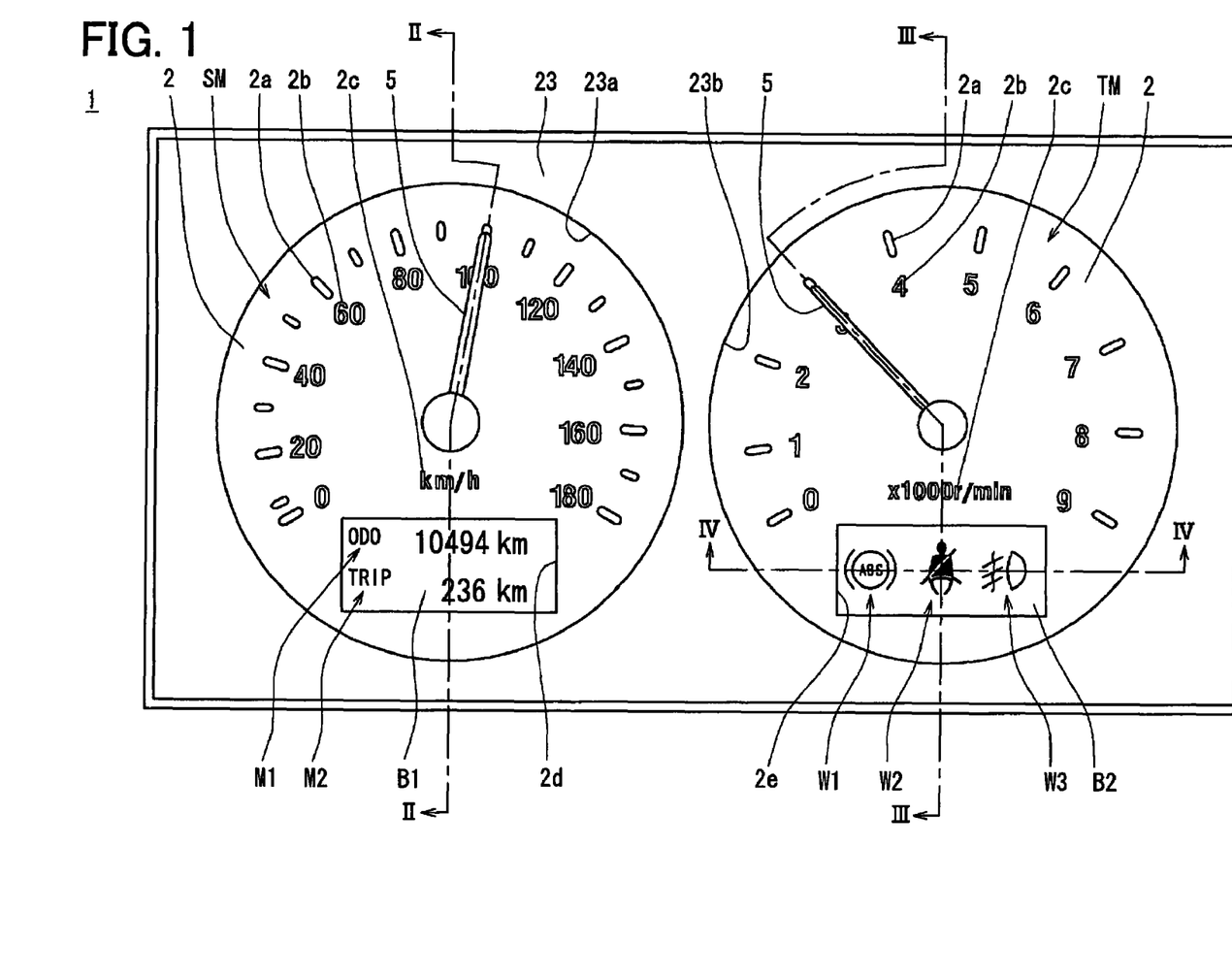
FIG. 1 is a front view of a combination meter according to a first example embodiment of the present invention.

A first example embodiment of a display device for a vehicle of the present invention will be described with reference to FIGS. 1 to 5. As shown in FIG. 1, the display device is for example employed to a combination meter 1 of a vehicle such as an automobile. The combination meter 1 is for example located in front of a driver's seat in a passenger compartment of the vehicle, so that a driver can easily see.

Figure 2:
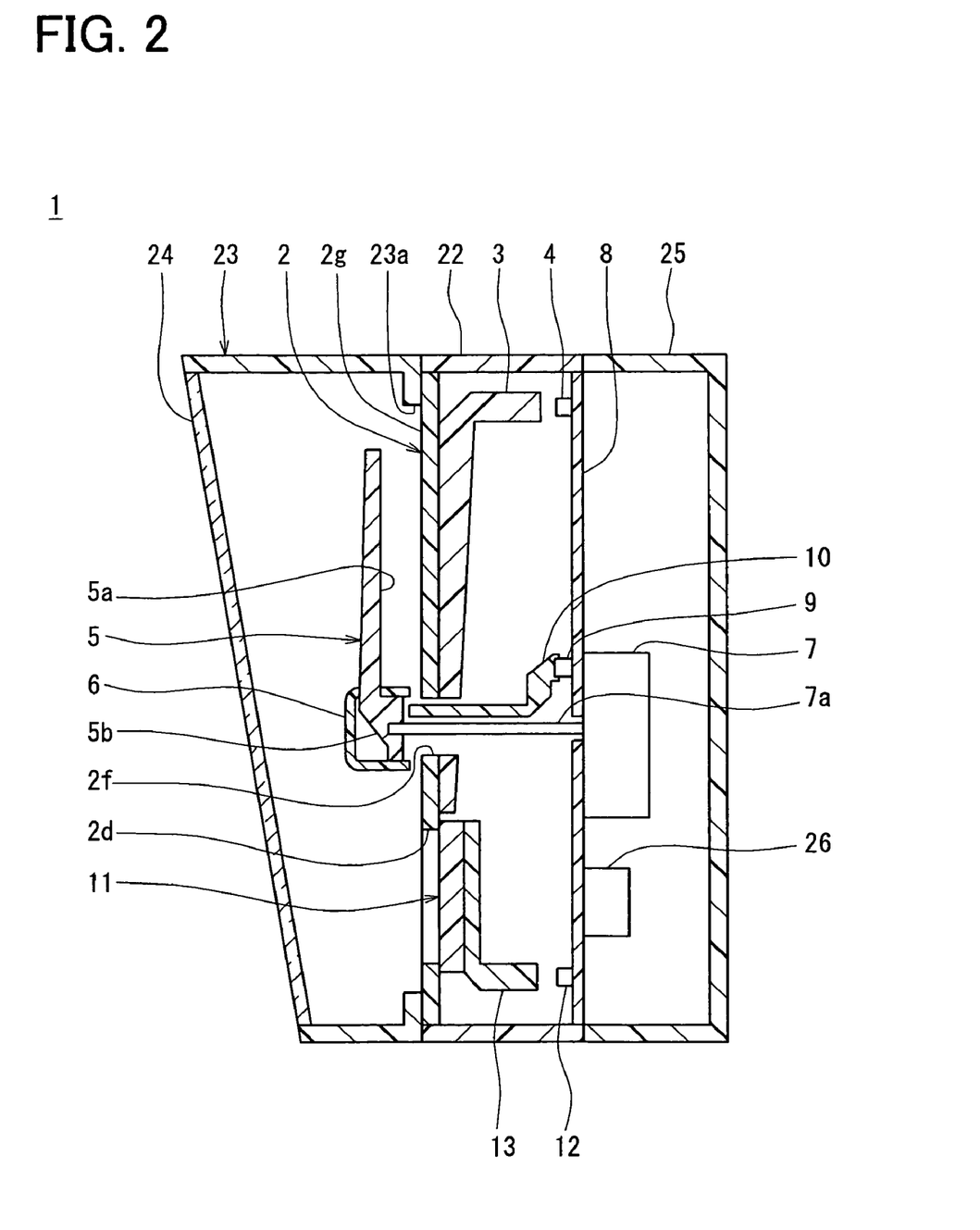
FIG. 2 is a cross-sectional view of the combination meter taken along a line II-II of FIG. 1.
Figure 3:
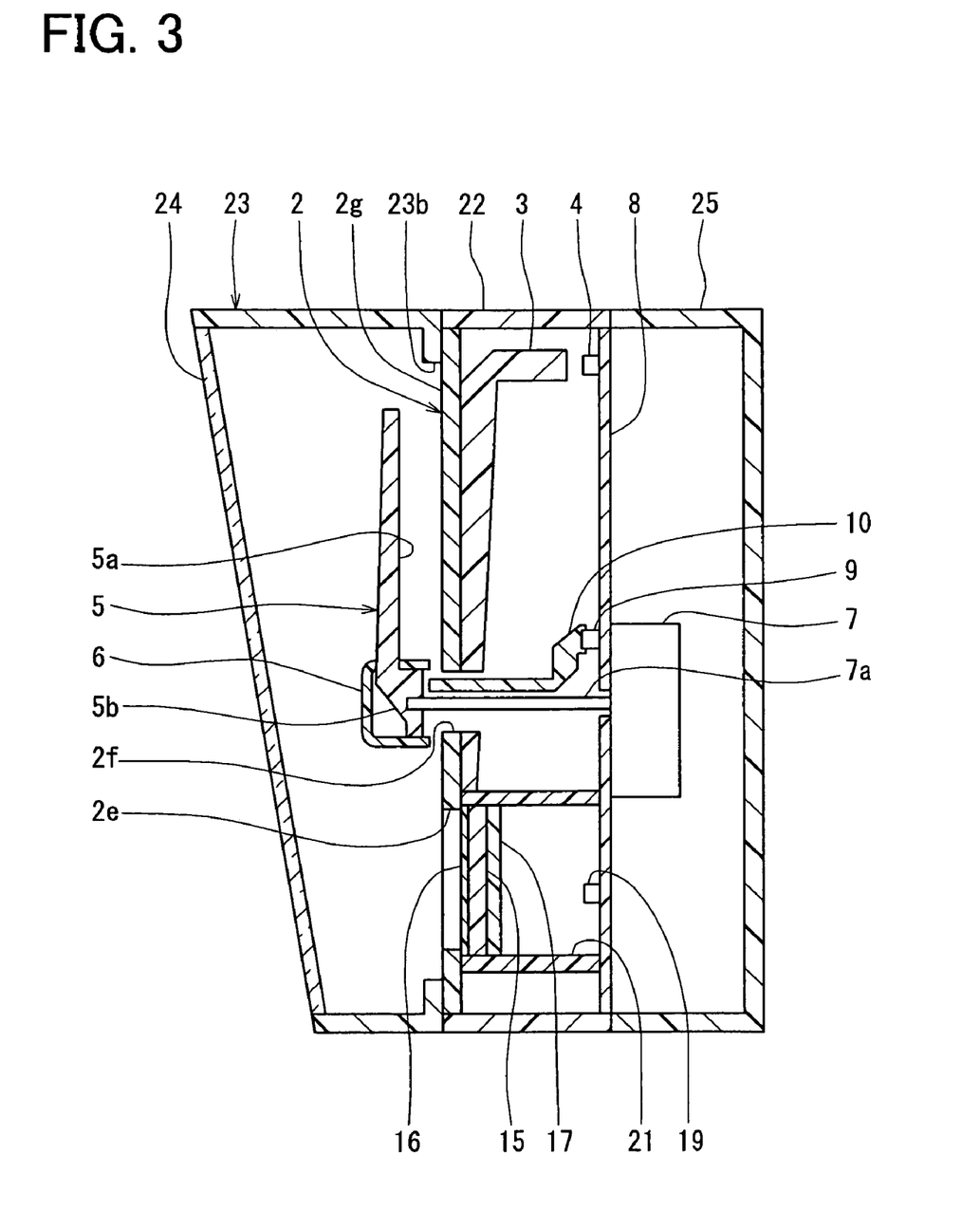
FIG. 3 is a cross-sectional view of the combination meter taken along a line III-III of FIG. 1.

In FIG. 1, an up and down direction of the combination meter 1 generally corresponds to a vertical direction of the vehicle when the combination meter 1 is mounted on the vehicle. Also, a transverse direction of the combination meter 1 generally corresponds to a right and left direction of the vehicle, for example. In FIGS. 2 and 3, the left side is a front side of the combination meter 1, which faces a driver, and the right side is a rear side of the combination meter 1. Namely, a left and right direction of FIGS. 2 and 3 corresponds to a front and rear direction of the combination meter 1, i.e., corresponds to a substantially rear and front direction of the vehicle. Thus, the combination meter 1 can be seen from the left side of FIGS. 2 and 3. Also, in FIG. 4, the top side corresponds to the front side of the combination meter 1.

As shown in FIG. 1, the combination meter 1 displays various information relating to operation conditions of the vehicle, such as a traveling speed of the vehicle and a rotational speed of an engine, and other information. For example, the combination meter 1 includes two indication instruments that indicate physical values by pointers 5. As the indication instruments, the combination meter 1 has a speed meter SM for indicating the speed of the vehicle and a tachometer TM for indicating the rotational speed of the engine, for example.

Further, in a display area of the speed meter SM, which is shown in a first opening 23a of a facing plate (facing member) 23, a display section for showing other information is provided. For example, an odometer M1 and a trip meter M2 are provided in the display area of the speed meter SM.

Likewise, in a display area of the tachometer TM, which is shown in a second opening 23b of the facing plate 23, a display section for showing other information is provided. For example, an ABS system warning indication section W1, a seat belt warning indication section W2 and a fog lamp indication section W3 are provided in the display area of the tachometer TM.

In the speed meter SM, the pointer 5 rotates along the front surface of a dial plate 2 to indicate the speed of the vehicle. The pointer 5 is rotated by a moving device 7 that is disposed on a back side of the dial plate 2.

As shown in FIGS. 2 and 3, the dial plate 2 is located on a rear side of the facing plate 23. The dial plate 2 is a plate member made of a material having light transmissivity, i.e., allowing light to pass through. The dial plate 2 is for example made of a clear, colorless resin such as a polycarbonate resin and an acryl resin.

The dial plate 2 has scales 2a, numbers 2b and letters 2c for indicating the speed of the vehicle, at a location corresponding to the first opening 23a of the facing plate 23. A lightproof film, which is imperviousness to light, is provided on the front surface 2g of the dial plate 2 such as by printing, at a location other than the scales 2a, the numbers 2b and the letters 2c. Namely, the scales 2a, the numbers 2b and the letters 2c are hollowed or cut out in the lightproof film. Therefore, portions corresponding to the scales 2a, the numbers 2b and the letters 2c allow light to pass through, and portions other than the scales 2a, the numbers 2b and the letters 2c do not allow light to pass through.

A light-emitting diode 4 is provided on the rear side of the dial plate 2. As such, the scales 2a, the numbers 2b and the letters 2c are lit by the diode 4 and luminously displayed. The dial plate 2 also provides a dial plate for the tachometer TM.

The display section for the odometer M1 and the trip meter M2 is constructed of a liquid crystal display 11. The dial plate 2 forms a first opening window 2d in the display area of the speed meter SM. The liquid crystal display 11 is located on the rear side of the dial plate 2 at a location corresponding to the first opening window 2d. Thus, the driver can see the liquid crystal display 11 in the first window 2d, as shown in FIG. 1. The first window 2d for example has a rectangular shape.

Also, the dial plate 2 forms a through hole 2f for passing through a shaft 7a that supports the pointer 5. The shaft 7a is rotated by the moving device 7 as a driving device.

In the dial plate 2, for example, the portions corresponding to the scales 2a, the numbers 2b and the letters 2c are coated with transparent white coloring, and the portions other than the scales 2a, the numbers 2b and the letters 2c are coated with lightproof (light-shielding) black coloring. However, the color combination is not particularly limited. Alternatively, the portions corresponding to the scales 2a, the numbers 2b and the letters 2c can be maintained transparent without coloring. In this case, the scales 2a, the numbers 2b and the letters 2c are illuminated in a color of the diode 4.

A light conductive plate 3 is provided on the rear side of the dial plate 2, i.e., between the dial plate 2 and the diode 4. The light conductive plate 3 conducts light emitted from the diode 4 toward the dial plate 2. The light conductive plate 3 is made of a material having light transmissivity. For example, the light conductive plate 3 is made of a clear, colorless resin such as a polycarbonate resin or an acryl resin.

Likewise, the pointer 5 is made of a material having light transmissivity. For example, the pointer 5 is made of a clear, colorless resin, such as a polycarbonate resin or an acryl resin.

The pointer 5 is fixed to an end of the shaft 7a. When the moving device 7 is driven, the shaft 7a is rotated. As such, the pointer 5 rotates with the shaft 7a.

For example, the rear surface 5a of the pointer 5, which faces the dial plate 2, is colored in red such as by printing or hot stamping. On the rear side of the dial plate 2, a light emitting diode 9 is provided adjacent to the shaft 7a. Also, a light conductive member 10 is provided along the shaft 7a, so that light emitted from the diode 9 is conducted to the pointer 5. As such, the pointer 5 is illuminated in red by the light from the diode 9.

The light conductive member 10 is made of a material having light transmissivity. For example, the light conductive member 10 is made of a clear, colorless resin such as polycarbonate resin or acryl resin. The light conductive member 10 extends through the through hole 2f of the dial plate 2 toward a first end of the pointer 5 such that the light can be incident on the pointer 5, the first end being supported by the shaft 7a. Further, in the pointer 5, the light is reflected to a second end of the pointer 5 by a reflecting surface 5b of the pointer 5, the second end being opposite to the first end. Furthermore, the light is reflected toward the front side of the combination meter 1 by the rear surface 5a of the pointer 5.

Here, the diode 9 is a white light-emitting diode, for example. As such, the pointer 5 is illuminated in the color of the rear surface 5a, i.e., illuminated in red. The illuminating color of the pointer 5 is not limited to red. The rear surface 5a of the pointer 5 can be colored in another color. In this case, when the white light emitting diode is used as the diode 9, the pointer 5 is illuminated in the another color. Alternatively, the rear surface 5a of the pointer 5 can be coated with a white color layer, and a diode that emits a colored light can be used as the diode 9. In this case, the pointer 5 is illuminated in the color of the light emitted from the diode 9.

The moving device 7 is for example constructed of a cross coil-type actuator or a stepping motor. When a voltage is applied to the moving device 7, the moving device 7 generates torque. Thus, the shaft 7a, which is a rotation axis of the moving device 7, rotates. Accordingly, the pointer 5 rotates about a center 6 along the front surface 2g of the dial plate 2.

The diodes 4, 9 and the moving device 7 are mounted on a printed board 8 that is arranged on the rear side of the dial plate 2. The printed board 8 is for example constructed of a glass epoxy board. The printed board 8 provides an electric circuit unit of the speed meter SM. The printed board 8 also constructs a printed board for the tachometer TM. Namely, the combination meter 1 has the single printed board 8 for plural indication instrument.

Further, as shown in FIG. 2, a controller 26 is mounted on the printed board 8. The controller 26 controls an operation of the speed meter SM. Namely, the controller 26 controls on/off operations of the diodes 4, 9, and an operation of the moving device 7. For example, the controller 26 includes a microcomputer and the like. The controller 26 also controls an operation of the tachometer TM. Further, the controller 26 controls an entire operation of the combination meter 1.

The dial plate 2 and the printed board 8 are housed in a main case 22. The facing plate 23 is arranged on the front side of the dial plate 2. A front end of the main case 22 connects to a rear end of the facing plate 23. The facing plate 23 is for example made of a resin. The facing plate 23 has a substantially frame-like structure having an end wall. The first opening 23a and the second opening 23b are formed on the end wall of the facing plate 23.

The facing plate 23 is arranged with respect to the dial plate 2 such that predetermined regions of the dial plate 2 can be visible through the first opening 23a and the second opening 23b. The perimeter of the first opening 23a defines a contour of the speed meter SM. In other words, in the dial plate 2, the region corresponding to the first opening 23a is the display area of the speed meter SM.

Likewise, the perimeter of the second opening 23b defines a contour of the tachometer TM. In other words, in the dial plate 2, the region corresponding to the second opening 23b of the display area of the tachometer TM.

For example, the first opening 23a and the second opening 23b have a circular shape with the same diameter. Also, the first opening 23a and the second opening 23b are disposed substantially symmetric with respect to the right and left direction of the combination meter 1. Here, the shape of the first and second openings 23a, 23b is not limited to circle, but may have another shape. For example, the first and second openings 23a, 23b can have a semi-circular shape or a generally round shape with a straight side at the bottom.

As shown in FIG. 2, a transparent cover 24 is provided at a front end of the facing plate 23. For example, the cover 24 is a clear, colorless plate member made of a polycarbonate resin, an acryl resin, a glass or the like. The cover 24 restricts the entry of foreign materials such as dust and water to the combination meter 1.

Further, a back case 25 is provided on a side opposite to the facing plate 23 with respect to the main case 22. Namely, the rear end of the main case 22 is covered with the back case 25. The back case 25 is for example made of a resin.

In the display area of the speed meter SM, the odometer M1 and the trip meter M2 are displayed. The odometer M1 displays a cumulative traveling distance of the vehicle. The trip meter M2 displays a sectional traveling distance of the vehicle. The odometer M1 and the trip meter M2 are constructed of the liquid crystal display 11. Namely, the cumulative traveling distance and the sectional traveling distance are digitally shown in numbers on the liquid crystal display 11. The liquid crystal display 11 is for example a dot-matrix display.

As shown in FIG. 2, the liquid crystal display 11 is arranged beside the second window 2d of the dial plate 2, on the rear side of the dial plate 2 so that the liquid crystal display 11 is visible through the first window 2d. The first window 2d is slightly smaller than a display area of the liquid crystal display 11. The liquid crystal display 11 is fixed such that the perimeter of the first window 2d is located inside of the display area.

Further, on the rear side of the liquid crystal display 11, a light emitting diode 12 is provided for illuminating the liquid crystal display 11, as a first light source. The diode 12 is mounted on the printed board 8. Further, a light conductive plate 13 is provided on the rear side of the liquid crystal display 11 to conduct light emitted from the diode 12 to the liquid crystal display 11. The light conductive plate 13 is made of a material having light transmissivity. For example, the light conductive plate 13 is a clear, colorless member made of such as a polycarbonate resin of an acryl resin.

During the operation of the combination meter 1, the liquid crystal display 11 is controlled such that numbers and letters of the odometer M1 and the trip meter M2 allow light to pass through and a first background area B1 do not allow light to pass through, i.e., light-shielded. Here, the first background area B1 is an area other than the numbers and the letters of the odometer M1 and the trip meter M2 within a display area of the liquid crystal display 11. Therefore, the numbers and letters of the odometer M1 and the trip meter M2, as the first display design, are luminously displayed according to the light from the diode 12. Namely, the numbers and letters of the odometer M1 and the trip meter M2 are shown at an intensity higher than that of the first background area B1. Although the first background area B1 is controlled in the light-shielded condition, the light slightly passes through the first background area B1. Therefore, the first background area B1 is not visible in black, but visible in deep blue, for example.

The tachometer TM has a structure similar to the speed meter SM, as in indication instrument. For example, regarding the dial plate 2, the pointer 5, the moving device 7 and the diodes 4, 9, the tachometer TM has the same structures as those of the speed meter SM.

Referring to FIG. 3, the dial plate 2 has a second opening window 2e in the display area of the tachometer TM to provide a display portion. The second window 2e has the same outline as that of the first window 2d of the speed meter SM. Indicators or warning signs (marks) such as the ABS system warning mark W1, the seat belt waning mark W2 and the fog lamp indicator W3 are displayed in the second window 2e, as second display designs.

The ABS system warning mark W1 is lit when an abnormal condition is detected in an ABS system of the vehicle, thereby to warn the driver about an occurrence of the abnormal condition. The seat belt warning mark W2 is lit when the driver does not properly fasten a seat belt, thereby to urge the driver to fasten the seat belt. The fog lamp indicator W3 is lit when a fog lamp switch is operated to a lighting position, to thereby inform the driver that the fog lamp remains on.

The ABS system warning mark W1, the seat belt warning mark W2 and the fog lamp indicator W3 are formed on a design plate 17, as shown in FIG. 3. The design plate 17 is made of a material having light transmissivity. For example, the design plate 17 is a clear, colorless plate made of such as a polycarbonate resin or an acryl resin.

The ABS system warning mark W1, the seat belt warning mark W2 and the fog lamp indicator W3 are formed by applying a transparent white color coating on a front surface or a rear surface of the design plate 17 such as by printing or hot stamping. Also, a light-shielding black coating is applied on the periphery of the ABS system warning mark W1, the seat belt warning mark W2 and the fog lamp indicator W3, on the front surface or the rear surface of the design plate 17. The periphery of the ABS system warning mark W1, the seat belt warning mark W2 and the fog lamp indicator W3 defines a second background are B2.

Instead of the transparent white color coating, the ABS system warning mark W1, the seat belt warning mark W2 and the fog lamp indicator W3 can be cut out from the light-shielding black coating. Namely, the ABS system warning mark W1, the seat belt warning mark W2 and the fog lamp indicator W3 can be maintained in colorless and transparent.

Figure 4:
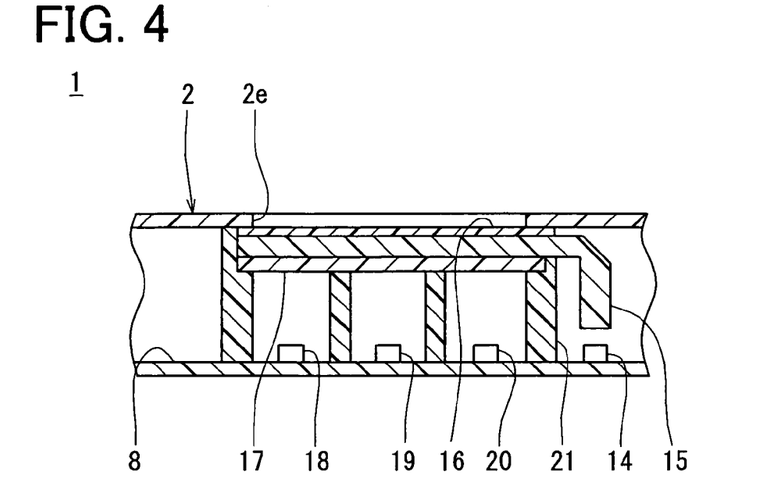
FIG. 4 is a cross-sectional view of the combination meter taken along a line IV-IV of FIG. 1.

As shown in FIG. 4, diodes 18 to 20 are provided on the rear side of the design plate 17 (bottom side in FIG. 4), as a third light source. The diodes 18 to 20 are disposed to correspond to the transparent white color coating, the ABS system warning mark W1, the seat belt warning mark W2 and the fog lamp indicator W3, respectively. The diodes 18 to 20 are mounted on the printed board 18.

The diode 18 for the ABS system warning mark W1 emits a light in amber, for example. The diode 19 for the seat belt warning mark W2 is for example a red light emitting diode. The diode 20 for the fog lamp indicator W3 is for example a green light emitting diode. Accordingly, the ABS system warning mark W1, the seat belt warning mark W2 and the fog lamp indicator W3 are illuminated in amber, red, and green, respectively, in the second background B2.

Also, a separation member 21 is provided between the design plate 17 and the printed board 8, as shown in FIG. 4. The separation member 21 is for example made of a resin. The separation member 21 has a ladder shaped cross-section. As such, each of the diodes 18 to 20 is disposed in a chamber defined by walls of the separation member 21, the printed board 8 and the design plate 17. Accordingly, when one of the diodes 18 to 20 emits light, only the corresponding one of the marks and indicator W1 to W3 is illuminated. Namely, it is less likely that the second display designs will be illuminated by adjacent diodes.

As shown in FIGS. 3 and 4, a light conductive plate 15 is provided on the rear side of the dial plate 2 and on the front side of the design plate 17 (above the design plate 17, in FIG. 4). The light conductive plate 15 is made of a material having light transmissivity. For example, the light conductive plate 17 is a clear, colorless member made of such as a polycarbonate resin or an acryl resin.

Further, a color sheet 16 is adhered to the front surface of the light conductive plate 15 (top surface in FIG. 4), as an optical coloring member. The color sheet 16 is for example made of a resinous thin film processed by transparent coloring. Thus, the color sheet 16 has a color and light transmissivity. The color sheet 16 is dark blue, for example.

A light-emitting diode 14 is mounted on the printed board 8, as a second light source, such that a light emitted from the diode 14 is incident on the light conductive plate 15. The diode 14 is for example a white light emitting diode. The light emitted from the diode 14 is conducted to the light conductive plate 15. Further, the light passes through the color sheet 16, thereby illuminating a display area in the second window 2e in dark blue. Accordingly, the second background area B2, which is background of the second display designs including the ABS system warning mark W1, the seal belt warning mark W2 and the fog lamp indicator W3, is illuminated in dark blue.

Here, the color sheet 16 is processed to have a predetermined color phase (hue) and lightness such that the illuminating color and brightness (luminance) of the second background area B2 are substantially equal to those of the first background area B1 of the liquid crystal display 11 while the diodes 12, 14 are lighting up. Namely, the second background area B2 is visible substantially equal to the first background B1 while the diodes 12, 14 are lighting up, with respect to the illuminating color and brightness.

Next, an electric circuit structure of the above combination meter 1 will be described with reference to FIG. 5.

Figure 5:
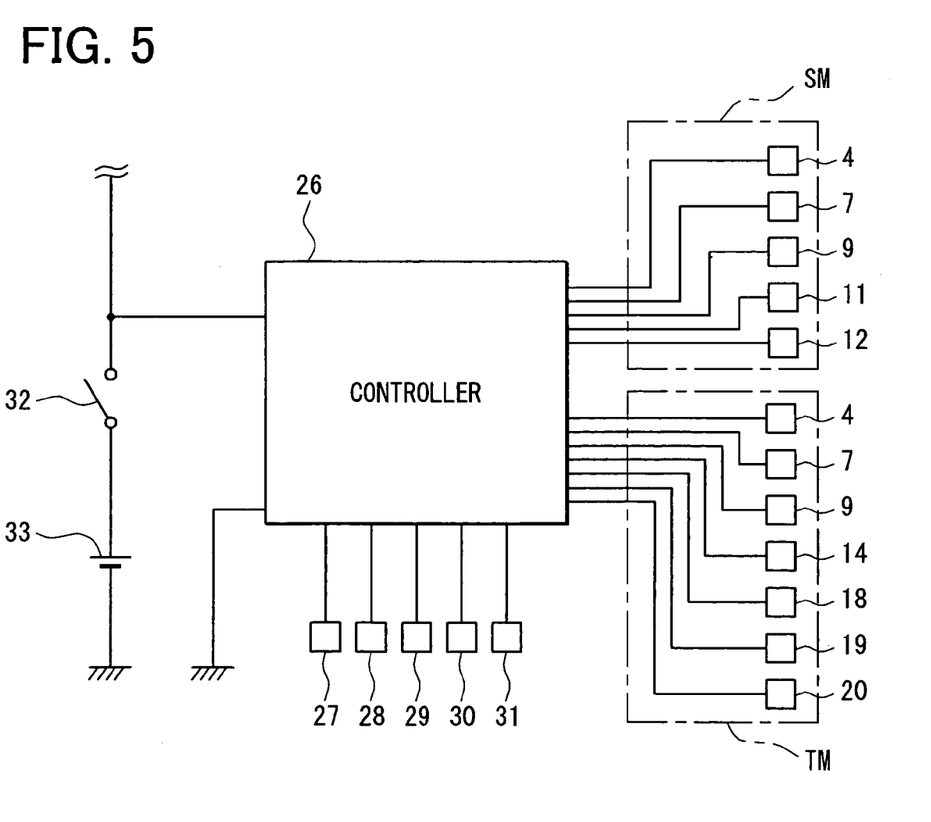
FIG. 5 is a schematic block diagram for showing an electric circuit structure of the combination meter according to the first example embodiment.

As shown in FIG. 5, the controller 26 is normally connected to a battery 33. The controller 26 is also connected to the battery 33 through an ignition switch 32. As such, the controller 26 can detect on/off conditions of the ignition switch 32.

The controller 26 is connected to a speed sensor 27 for detecting the traveling speed of the vehicle, a rotation sensor 28, an ABS system control device 29, a seat belt sensor 30, a fog lamp switch 31. Thus, signals from the preceding sensors and devices 27 to 31 can be input to the controller 26. The rotation sensor 28 detects a rotational speed of the engine.

For example, the speed sensor 27 detects a revolution speed of an output shaft of a transmission of the vehicle, i.e., a revolution speed of a propeller shaft (not shown). The controller 26 calculates the traveling speed of the vehicle based on an output signal of the speed sensor 27 and further calculating the travel distance of the vehicle. Namely, the speed meter SM, the odometer M1 and the trip meter M2 are controlled to indicate respective information based on the output signal from the speed sensor 27.

The ABS system control device 29 controls an operation of the ABS system of the vehicle. When an abnormal condition occurs in the ABS system, a signal for informing an occurrence of the abnormal condition is transmitted from the ABS system control device 29 to the controller 26. Based on the signal, the controller 26 controls the diode 18 to emit light. Accordingly, the ABS system warning mark W3 is illuminated in amber. The controller 26 is connected to the diodes 4, 9, 12, 18 to 20, the moving devices 7, the liquid crystal display 11 to control thereof.

Next, an operation of the combination meter 1 will be described.

When the ignition switch 32 is turned on, the controller 26 detects the condition of the ignition switch 32 and starts a control operation of the combination meter 1.

First, the diodes 4, 9, 12 are lit up, and the moving devices 7 and the liquid crystal display 11 are driven. As such, the scales 2a, the numbers 2b and the letters 2c of the speed meter SM and the tachometer TM are illuminated. Also, the pointers 5 are illuminated. Further, the moving devices 7 rotate the shafts 7a such that the pointers 5 indicate the traveling speed and the engine rotational speed based on the detected signals of the speed sensor 27 and the rotational sensor 28, respectively.

At this time, the liquid crystal display 11 is in an operable condition. Thus, the odometer M1 and the trip meter M2 are luminously displayed in bright white color in the first background area B1 of dark blue. In this case, the cumulative traveling distance and the sectional traveling distance at the time when the ignition switch was turned off last time are displayed first. Then, such display data is updated according to the detected signal of the speed sensor 27.

Next, the controller 26 controls the diodes 18 to 20 to emit light according to the output signals of the ABS system control device 29, the seat belt sensor 30 and the fog lamp switch 31, as needed.

For example, if an abnormal condition of the ABS system is detected, the ABS system control device 29 sends the signal to the controller 26. Based on this signal, the controller 26 controls the diode 18 to light up. Accordingly, the ABS system warning mark W1 is illuminated in amber in the second window 2e of the dial plate 2. When the abnormal condition of the ABS system is resolved, the diode 18 is extinguished. Accordingly, the ABS system warning mark W1 extinguishes.

When it is detected that the seat belt (not shown) is not properly fastened, the seat belt sensor 30 outputs the signal to the controller 26. Based on the signal, the controller 26 controls the diode 19 to emit light. As such, the seat belt warning mark W2 is illuminated in red in the second window 2e on the dial plate 2. When it is detected that the seat belt is properly fastened, the diode 19 is extinguished. Accordingly, the seat belt warning mark W2 extinguishes.

When the fog lamp switch 31 is turned on, that is, when the fog lamp switch 31 is operated to the lighting position, the controller 26 controls the diode 20 to emit light based on the output signal from the fog lamp switch 31. As such, the fog lamp indicator W3 is illuminated in green in the second window 2e on the dial plate 2. When it is detected that the fog lamp switch 31 is turned off, that is when the fog lamp switch 31 is operated to an OFF position, the diode 20 is extinguished. Accordingly, the fog lamp indicator W3 extinguishes.

The brightness of each of the diodes 18 to 20 is set such that the corresponding one of the ABS system warning mark W1, the seat belt warning mark W2 and the fog lamp indicator W3 can pass through the color sheet 16, which is colored in dark blue, and be clearly recognized.

When the ignition switch 32 is turned off, the controller 26 detects the condition of the ignition switch 32. Thus, the controller 26 stops the operation of the combination meter 1.

First, the diodes 4, 9, 12, 18 to 20 are extinguished. Then, the moving devices 7 are driven such that the pointers 5 rotate to original positions. Namely, the pointer 5 of the speed meter SM returns to a position indicating 0 km/h. Also, the pointer 5 of the tachometer TM returns to a position indicating 0 rpm.

Further, the controller 26 stores data relating to the cumulative traveling speed and the sectional traveling speed that had been displayed on the odometer M1 and the trip meter M2 just before the ignition switch 32 was turned off.

Next, advantageous effects of the first example embodiment will be described. In the first example embodiment, the combination meter 1 is mainly characterized by structures of the display portion having the ABS system warning W1, the seat belt warning mark W2 and for lamp indicator W3.

When the combination meter 1 is in the operation condition, the liquid crystal display 11 is illuminated by receiving the light emitted from the diode 12 as the first light source. Thus, the display designs are transparently displayed in the light-shielded background area B1. At this time, the light from the first light source 12 is conducted over the liquid crystal display 11. Therefore, the light-shielded background area B1 is slightly illuminated. Accordingly, the first background area B1 is visible in dark blue at low intensity, not in perfect black.

On the contrary, if the display portion for showing the second designs such as the warning marks and indicators W1 to W3 is constructed by transparently coloring the second designs on a matte black dial plate, the second background of the display portion, i.e., the area other than the second display designs in the second window 2e is visible in perfect black.

In this case, the first background B1 of the liquid crystal display 11 and the second background B2 of the display portion in the second window 2e have different color phase and brightness. As a result, the liquid crystal display 11 and the display portion that is not constructed of the liquid crystal display reduce harmony in appearances. Furthermore, the appearance of the combination meter 1 is likely to deteriorate.

In the first example embodiment, however, it is configured that the second background area B2, which is on a periphery of the ABS system warning mark W1, the seat belt warning mark W2 and the fog lamp indicator W3, is illuminated by conducting the light emitted from the diode 14 through the light conductive plate 15. Further, the color sheet 16 is provided on the front surface of the light conductive plate 15. Furthermore, the color sheet 16 is processed to have the predetermined hue and lightness such that the illuminating color and brightness of the second background area B2 are substantially equal to those of the first background area B1 of the liquid crystal display 11 when the diodes 12, 14 are lighting up.

Therefore, the first background area B1 and the second background area B2 can be seen substantially equal in the illuminating color and brightness. In other words, the display portion shown in the second window 2e has an appearance similar to that of the liquid crystal display. Further, it looks as if the display portion in the second window 2e is constructed of the liquid crystal display. Accordingly, the appearances of the liquid crystal display 11 and the second window 2e are uniformed and substantially even.

As such, the appearance of the combination meter 1 can be improved without increasing the number of liquid crystal displays, which is generally expensive.

Further, the light conductive member 15 is arranged over the front surface of the design plate 17 and the color sheet 16 is provided over the front surface of the light conductive plate 15. Thus, the illuminating color and the brightness of the second background B2 are substantially even over the second background area B2.

Moreover, the combination meter 1 has the speed meter SM and the tachometer TM as the indication instruments. The first display window 2d constructed of the liquid crystal display 11 is located in the first display area (first opening 23a) of the speed meter SM. Likewise, the second display window 2e is located in the second display area (second opening 23b) of the tachometer TM. Further, the first display window 2d and the second display window 2e have the same outline, i.e., the same shape.

Accordingly, the display areas of the speed meter SM and the tachometer TM can be effectively used. Further, the appearance of each indication instrument improves. With this, the entire appearance of the combination meter 1 improves.

Second Example Embodiment

Figure 6:
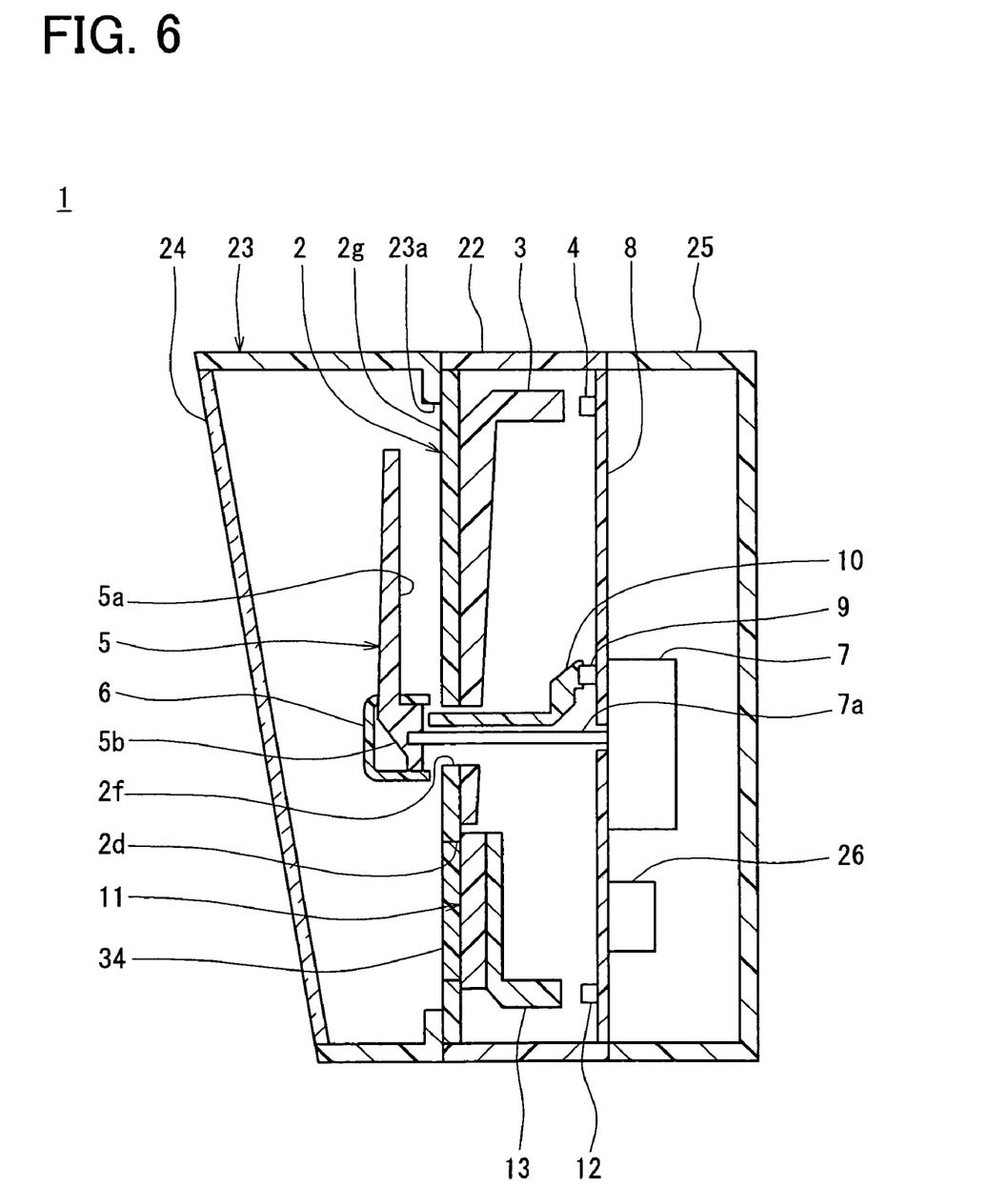
FIG. 6 is a cross-sectional view of a combination meter according to a second example embodiment of the present invention.

Next, a second example embodiment of the combination meter 1 will be described with reference to FIG. 6. In the second example embodiment, smoked plates 34 are disposed in the first and second opening windows 2d, 2e, respectively, as an optical member for adjusting light transmissivity. As shown in FIG. 6, the smoked plate 34 is fitted in the first window 2d. Although not illustrated, the smoked plate 34 is also fitted in the second window 2e similarly.

In the second example embodiment, during the operation of the combination meter 1, advantageous effects similar to those of the first example embodiment are provided. For example, when the diodes 12, 14 are lighting up, the first background area B1 of the liquid crystal display 11 and the second background B2 are visible substantially equal. That is, the first background area B1 and the second background B2 have the substantially same illuminating color and brightness.

In a condition that the combination meter 1 is not operated, if the smoked plates 34 are not mounted, the first background area B1 and the second background area B2 are likely to be visible differently in color and brightness due to an external light, such as a sun light. Namely, if the external light enters the combination meter 1, the first background area B1 is visible substantially in black. On the contrary, the color sheet 16 reflects the external light. Therefore, the second background area B2 in the display window 2e is visible in the color of the color sheet 16, e.g., dark blue.

In the second example embodiment, the smoked plates 34 are mounted in the first window 2d and the second window 2e. Therefore, the color sheet 16 looks darker than the case without having the smoked plate 34. Namely, the brightness of the second background area B2 is reduced.

Accordingly, in the condition that the combination meter 1 is not operated, appearance differences (e.g., color differences) between the first background area B1 and the second background B2 are reduced. As such, the appearance of the combination meter 1 improves.

Here, the smoked plates 34 are processed to have predetermined light transmissivity and predetermined color phase (hue) and lightness. Namely, the smoked plates 34 have predetermined color phase and lightness such that the first background area B1 and the second background area B2 are visible in substantially equal illuminating color and brightness during the operation of the combination meter 1, and the appearance differences (color differences) between the first background area B1 and the second background area B2 while the combination meter 1 is not operated are reduced.

In the illustrated example of FIG. 6, the smoke plates 34 are fitted in the first opening window 2d and the second opening window 2e of the facing plate 23. However, the arrangement position of the smoked plates 34 is not limited to the above. For example, the smoked plate 34 can be overlaid on the transparent cover 24. Alternatively, the transparent cover 24 itself can be formed as a smoked plate.

In the first and second example embodiments, the combination meter 1 has the speed meter SM and the tachometer TM as the indication instruments. However, the configuration of the combination meter 1 is not limited to the above. For example, one of the speed meter SM and the tachometer TM can be replaced into another indication instrument, such as a water temperature gauge, a fuel gauge, a clock.

Further, the combination meter 1 has three display designs (ABS system warning mark W1, seat belt warning mark W2, fog lamp indicator W3) in the second display window 2e. However, the number of the second display designs are not limited to three. Further, the kinds of the display designs are not limited to the ABS system warning mark W1, the seat belt warning mark W2, the fog lamp indicator W3. The second display designs can be other warning marks and indicators.

Also, the information displayed on the liquid crystal display 11 is not limited to the odometer M1 and the trip meter M2. Another information such as fuel efficiency or average sectional speed can be displayed on the liquid crystal display 11.

In the first and second example embodiments, the light emitting diodes 4, 9, 12, 14, 18, 19, 20 are used as light sources. However, the light sources are not limited to light emitting diodes. At least one of or all of the light sources can be constructed of other light emitting devices such as an electric light bulb, a discharge lamp, EL panel and the like. Furthermore, the illuminating color combinations and variations in the above combination meter 1 is not limited to the above.

Further, the use of the present invention is not limited to the combination meter 1 for the vehicle. The present invention can be employed to a display device for another purpose in which a first display information is displayed on a liquid crystal display and a second display information is displayed on a display member other than the liquid crystal display.

The example embodiments of the present invention are described above. However, the present invention is not limited to the above example embodiments, but may be implemented in other ways without departing from the spirit of the invention.

What is claimed is:

1. A display device for a vehicle, comprising:
a first display unit having a first light source for emitting light and a liquid crystal display illuminated by the light emitted from the first light source, the liquid crystal display displaying first information at an intensity higher than an intensity of a first background area that is on a periphery of the first information in the liquid crystal display;
a second display unit having a second light source and a third light source for emitting light and a display portion that displays second information, the second information illuminated by the light emitted from the third light source and displayed at an intensity higher than an intensity of a second background area that is illuminated by the light emitted from the second light source, the second background area being on a periphery of the second information in the display portion; and an optical coloring member that adjusts an illuminating color and a brightness of the second background area to substantially coincide with an illuminating color and a brightness, respectively, of the first background area when both of the first light source and the second light source light up to illuminate the liquid crystal display and the optical coloring member, respectively.

2. The display device according to claim 1, wherein the second background area of the second display unit has an outline substantially equal to that of the first background area of the first display unit.

3. The display device according to claim 1, wherein the first display unit constructs one of a speed meter for indicating a traveling speed of the vehicle and a tachometer for indicating a rotational speed of an engine of the vehicle, and the second display unit constructs the other one of the speed meter and the tachometer.

4. The display device according to claim 1, wherein the second information includes at least one of an indicator and a warning sign.

5. The display device according to claim 1, further comprising:

an optical member having a predetermined light transmissivity, wherein the optical member is disposed to cover at least the liquid crystal display and the display portion of the second display unit.

6. The display device according to claim 1, wherein the second display unit has a light conductive member that is disposed to introduce the light emitted from the second light source over the second background area, the light conductive member having a first surface and a second surface opposite to each other, and the optical coloring member is disposed on the first surface of the light conductive member.

7. The display device according to claim 6, wherein the second display unit has a design plate on which the second information is designed, the design plate is disposed along the second surface of the light conductive member, and the third light source is disposed on a side opposite to the light conductive member with respect to the design plate.

* * * * *